Dec. 10, 1968  J. H. RULE  3,415,492
FEED MIXER
Filed Feb. 17, 1966  2 Sheets-Sheet 1

INVENTOR.
John H. Rule
BY
*Scofield Kokjer, Scofield & Lowe*
ATTORNEYS.

Dec. 10, 1968

J. H. RULE 3,415,492

FEED MIXER

Filed Feb. 17, 1966

INVENTOR.
John H. Rule
BY
Scofield, Kokjer, Scofield & Lowe
ATTORNEYS.

United States Patent Office 3,415,492
Patented Dec. 10, 1968

3,415,492
FEED MIXER
John H. Rule, Herington, Kans. 67449
Filed Feb. 17, 1966, Ser. No. 528,114
4 Claims. (Cl. 259—3)

ABSTRACT OF THE DISCLOSURE

An apparatus for mixing and dispensing feed for animal consumption has an array of combined elements including a wagon floor conveyor with a cross conveyor located at the forward end thereof. A mixing unit receives the feed discharged from the wagon by the cross conveyor, mixes same, and delivers the mixed feed to another conveying means. The final conveying means deposits the mixed feed into the end opposite the discharging cross conveyor.

---

This invention relates to mixers, and more particularly to an apparatus for mixng and dispensing feed to be used for animal consumption.

The desirability of feeding animals a complete mixed ration of cracked grain, which may include ground cracked grain, protein supplement, minerals, vitamins, feed additives and roughage is well established not only for maintenance of health but for achievement of optimal growth rates. Both swine and cattle have a tendency to overeat the protein supplement if the animals are permitted to make a free choice where grain or protein supplement, and mixed ensilage are placed side by side. Thus it becomes important to an efficiently operating livestock feeder that a mixed feed be prepared and presented to the animals to ingest uniform quantities of the components of the feed.

A livestock feeder is generally faced with several alternatives as to how to obtain an optimally mixed and constituted feed ration for his particular animals and operation. It is, of course, possible that the complete, ready to be consumed, ration may be purchased or that grain and the appropriate supplement and additives may be hauled to a local mill to be ground and mixed. Alternatively, the feeder may process the feed components himself which includes mixing them in some manner with the appropriate commercial supplement. My invention is directed toward the latter alternative wherein the livestock feeder is provided with a novel method and means for mixing and processing his own feed ration.

It is therefore an object of this invention to provide a relatively simple, effective and economical cooperating apparatus array for transporting, feeding, mixing and returning to the transporter, an appropriate feed ration mixture.

Another object of this invention is to provide a feed mixing apparatus assembly wherein the feed components to be mixed initially are received in a mechanically feeding transporter, fed into a mixing device, circulated through the latter and thoroughly mixed and thereafter continuously returned to the conveyor transporter as a complete and appropriately mixed feed ration, all operations linked and carried out in sequence without human intervention.

A further object of the invention is to provide a novel process for mixing livestock feed, the process being completely carried out in sequence, without human intervention once the unmixed feed components have been placed in a charge vessel, the processes comprising the steps of continuously conveying the components out of the vessel and into a mixing unit, mixing the components thoroughly and transporting the mixed feed from the mixing unit back into the original charge vessel.

Another object of the invention is to provide a feed ration mixing apparatus, easily assembled and disassembled to allow for an economical mixing of the feed components when the need arises.

Another object of this invention is to provide an apparatus which may be used at different times to treat feed with animal disease preventatives and medications, dry grain before storage or mixing, and mix fertilizers and other granular substances of various types while having the advantage of utilizing components which substantially discharge all of the material passed therethrough in the process to thereby require a minimum of cleanout.

A further object of my invention is to provide a mixing unit which will receive therein unmixed quantities of ensilage, grain, protein supplement or the like uniformly as feed thereto and return same, as mixed, to the mechanically feeding transporter. The particular mixing unit employed in my inventive apparatus and process has: (1) a receiving chamber for unmixed feed components and apparatus therein for moving same into the mixer proper, (2) a rotating mixing drum employing counteracting spiral blades affixed to its interior and operative to simultaneously mix and move along the charge therewithin, and (3) a discharge member from where suitable means picks up charge and returns same to the original charge vessel.

Other and further objects of the invention will appear in the course of the following description thereof.

In the accompanying drawings, which form a part of the specification and are to be read in conjunction therewith, an embodiment of the invention is shown and, in the various views, like reference numerals are employed to indicate like parts.

Figure 1:
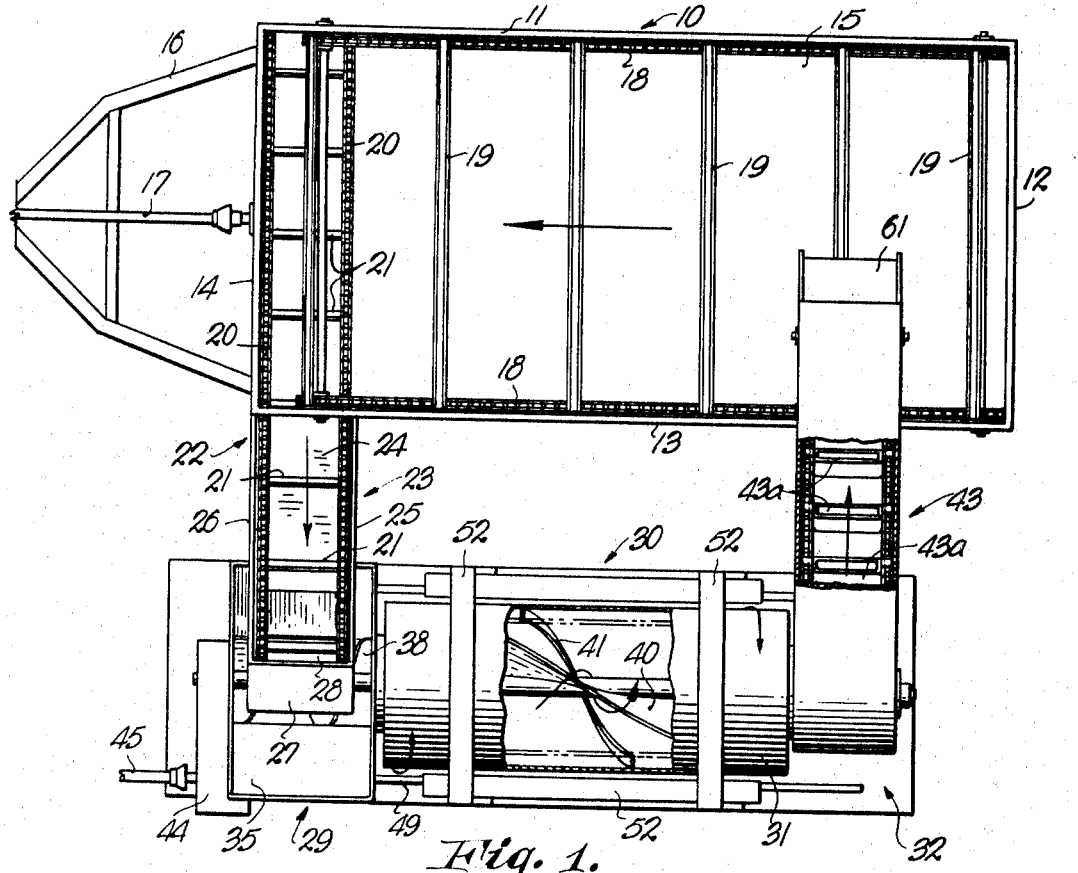
FIG. 1 is a top plan view of the various apparatus elements of the invention arranged to carry out my inventive process in the best and most economical manner, parts of the mixer cut away to better show the operative structure.

Referring now to the drawings, FIG. 1 shows the overall combination of the inventive apparatus array. Reference numeral 10 is used to designate a conventional moving bed feed trailer or bunk feeder wagon. Feeder wagon 10 has four sides, 11, 12, 13 and 14 which are vertically oriented with respect to a horizontal stationary bed 15. The sides will vary in height according to the material being hauled and to the rate at which the material is capable of being discharged from the wagon by a suitable discharge and conveyor means. Hitch 16 will be attached to a prime mover such as a truck or tractor when it is desired that the wheel mounted wagon bed be moved. A power take-off 17 extends from the left-hand of wagon 10, as seen in the views, and is used to rotatably move a conventional conveyor comprising chains 18 and slats 19 powered by power take-off 17. While the floor conveyor shown in FIG. 1 is of the two-chain single apron floor variety, it should be understood that the conveyor could be of two, three or four-chain conveyors with a single or double apron and having multi-speed operation available either by ratchet arrangements, changing sprockets, shifting gears or through the power take-off or yet other arrangements such as auger wagons. The floor conveyor depicted in FIG. 1 is designed to move from rear to front or right to left as shown by the arrow and cooperates with conventional rotating agitators (not shown) spaced between vertical sides 11 and 13 to move the entire material on the conveyor toward the front of the wagon. As each portion of the load reaches the front of wagon 10, the material will fall down on a cross conveyor, represented by chains 20 and single slats 21, which is continuously moving in a direction transverse to that if the first conveyor as seen by the arrow and having its longitudinal center located directly under the forwardmost edge of the first conveyor. The cross conveyor may include extensions or it is possible to run the cross conveyor at a high rate of speed and use deflector plates to control the material flow from the discharge point 22 of wagon 10. Feeder wagon 10 is designed to deliver material from the front left-hand corner looking in the direction of the arrow indicated on wagon 10. Discharge point 22 includes a large capacity adjustable elevator 23 which may be easily raised or lowered. Elevator 23 conveys the usually fluent material along its floor 24 and is equipped with vertical sides 25 and 26 and an enclosed end 27. As the cross conveyor reaches its forwardmost position, it is directly over an opening 28, so oriented as to allow the usually fluent material to fall therethrough. The vertical sides 25 and 26 cooperate with enclosed end 27 and opening 28 to define a gravity discharge chute which is used due to the fact that the cross conveyor is slightly lower than the wagon bed and it is oft times necessary to use an inclined elevator resulting in a discharge height possibly higher than the cross conveyor itself.

One of the previously mentioned objects of the apparatus array was to load the feeder wagon or transporter with the various components of feed which are to be mixed, discharge the unmixed feed from the wagon via a conveyor to a mixing station, thoroughly mix the feed components and return a completely mixed feed to the opposite end of the feeder wagon. Thus for an optimally operating apparatus array it is important that the speed of the cross conveyor and its dimensions be such that the input to mixing station can easily accommodate the volume of feed components delivered to it for mixing purposes.

Figure 2:
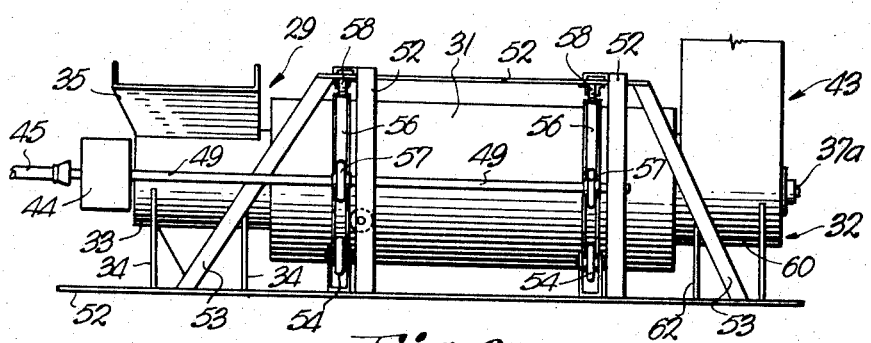
FIG. 2 is a side elevation of the feed mixer unit of the lower part of FIG. 1 looking upwardly from below in the latter view.
Figure 4:
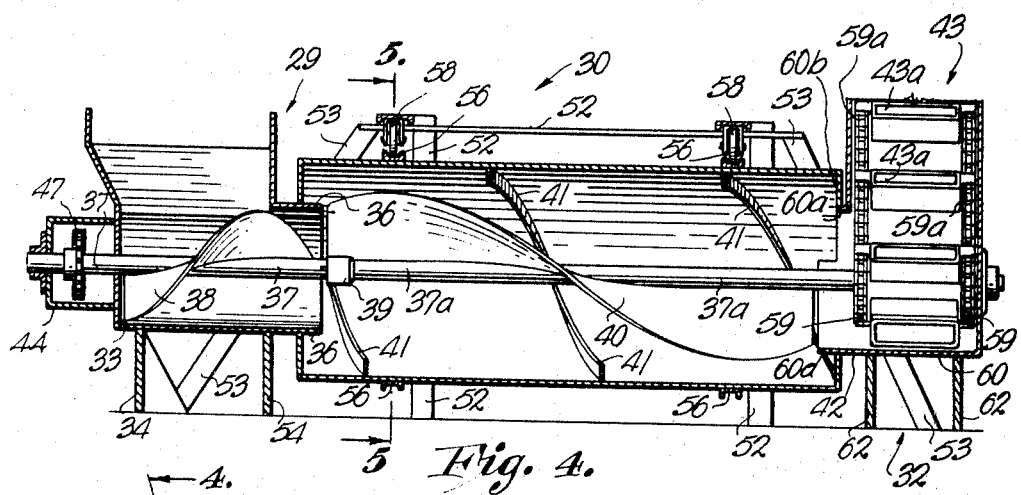
FIG. 4 is a vertical sectional view of the device of FIG. 2 taken along the line 4—4 of FIG. 3 in the direction of the arrows.

The fluent material, which may include ensilage and rough cut hay, grain supplement, etc., leaving the gravity discharge chute through opening 28, will enter the intake end 29 of the mixing unit generally shown at 30. The mixing unit 30 is divided into three separable sections. Input section 29 is affixed to the left end of mixing drum 31, as seen in FIGS. 1, 2 and 4. An output section 32 slidably engages the right-hand end of mixing drum 31 as seen in the various views. The particular construction and the connections between each end section and the mixing drum 31 will be discussed in more detail hereafter.

The intake end 29 comprises cylindrically shaped boot 33 cradled or supported upon steel supporting legs 34. Boot 33 has a portion of its upper wall cut away and a funnel-shaped deflector 35 rigidly affixed thereto. Deflector 35 is positioned directly below opening 28 of the gravity discharge chute and is in close proximity to receive the fluent material conveyed to the discharge chute by the cross conveyor. The right-hand end of boot 33 forms an extending lip 36 which slidably engages and extends interiorly of mixing drum 31. Lip 36 and the end wall are in close proximity, nevertheless allowing the drum to rotate without any loss of fluent feed components due to the inwardly extending nature of the lip therein.

Boot 33 has auger drive shaft 37 centrally mounted and extending the length thereof. The auger flighting 38 within boot 33 has a radial depth extending sufficiently close to the side walls of the boot to preclude any nontransfer of material. The pitch of flighting 38 is such as to serve the immediate function of conveying the fluent material into the interior of mixing drum 31. The funnel intake deflector 35 is usually rapidly filled with the feed components from wagon 10, some of which may be rather bulky such as ensilage or chopped hay. Thus the auger flighting necessarily has a relatively large pitch (a power auger) making one revolution in a short enough space to result in sufficient power to move the bulky material and preclude intake end 29 from clogging or spilling out of deflector 35, the latter because not enough material was being moved efficiently.

Auger drive shaft 37 is removably coupled at 39 to allow the entire intake section to slide in or out of engagement with rotating drum 31 further facilitating the assembly of the apparatus array.

The mixing drum 31 is cylindrical in shape and constructed of a tough metal such as steel. The drum is functionally made up of two main cooperating elements which include the rotating ability of the drum itself and the centrally mounted auger drive shaft 37 and cooperating flighting 40. The interior of mixing drum 31 includes rigidly positioned spiral (continuous or interrupted) ribbon blades 41. Mixing drum 31 and its associated blades 41 coact with the auger flighting 40 to make proper mixing of the feed components possible. Mixing drum 31 is rotated, by means discussed hereinafter, causing the appropriately spaced ribbon blades 41 to be rotatably moved in a direction opposite to the rotation of the auger flighting as best seen by the arrows in FIGS. 1 and 5.

When the feed components enter mixing drum 31 from intake end 29, the fluent feed components fall directly upon blades 41 due to the boot lip extension 36 and the close proximity of auger flighting 40 to the end of auger flighting 38 or optional continuity thereof with same. The counterclockwise moving auger flighting 40 then proceeds to move the feed components lengthwise in the mixing drum in the direction from the intake end toward the output section 32. Since grain has a tendency to be both more heavy and more fine than ensilage or ground hay and thus tends to spill out of auger flighting 40, the mass of the grain coupled with the centrifugal forces associated with the rotation of the material with the auger flighting, would preclude conveyance from input to output if it were not for the ability of the clockwise rotating drum 31 and blades to pick up and convey the spilled grain upwardly and cause it to be reintroduced into, mixed with and interlaced with the less heavy and more bulky feed components. The spiral or optionally periodically interrupted blades 41 pick up the grain or heavier more readily separable particles and lift them to the top of the drum whereupon they again drop onto the materials carried by auger flighting 40, which are continuously involved or more so with the lighter and more bulky materials such as the chopped ensilage or hay.

Auger flighting 40 is of such radial depth that there is approximately a two-inch clearance, represented at 42, between the outer edge of the auger flighting and the edges of the spiral blades 41. This particular clearance has been found to be the most satisfactory for a complete mixing operation as the roughage will be sheared and pulled apart whereby the seed and grain will be thoroughly mixed and amalgamated therewith. The unmixed grain will be picked up again by the next succeeding blade 41, raised to the top and dropped back into the mass. It has been found that if mixing cylinder 32 is rotated at approximately 20 r.p.m. and auger flighting 40 is driven at approximately 150 r.p.m. optimum mixing and also clear-out conditions are available. Furthermore, the pitch of the auger flighting 40 and blades 41 is so correlated with the rotational speed that grain which is picked up and carried over the auger does not fall until same passes top dead center of the auger drive shaft center whereby it is received on the forwardly inclined portion of the auger flighting 40. Thus, by the time the fluent material reaches the right-hand end of auger flighting 40, the grain, ensilage, chopped hay, etc. have been very well interlaced and mixed. If the grain has any residual tendency to again spill out, the rotary force imparted to the grain by auger flighting 40 directs it into boot 42 of output section 32 and the cooperating bucket elevator generally designated at 43. Likewise, the terminus of flighting 41 which runs to end wall 60b acts to deposit the mixed material on lip 60a.

Figure 3:
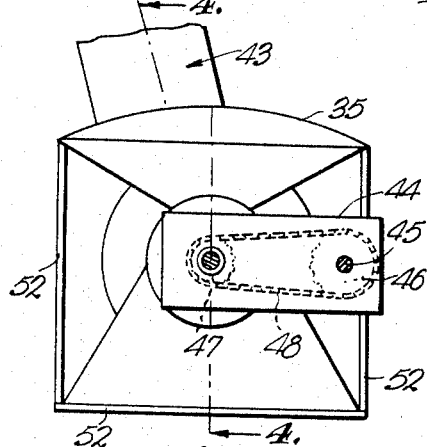
FIG. 3 is an end view from the left of the device of FIG. 2.

It is important to note that the relative speed and directional rotation of the cylinder rotation and the auger flighting 40 play a significant role in the final mixing of the fluent feed components. Mounted on the left end of input section 29 and shown at 44 is a chain transmission box operatively connected to any suitable input power supply such as a tractor power take-off or a separate electric or gasoline motor. Box 44 as shown in FIG. 3, contains a chain reduction gearing arrangement with an appropriate ratio so that power is supplied by power take-off 45 to sprocket 46, driving it in a counterclockwise direction. Sprocket 46 thusly rotates mixing drum drive shaft 49 and chain 48 in the same counterclockwise direction. Chain 48 also drives sprocket 47 counterclockwise, causing sprocket 47 to transmit a counterclockwise rotated force to auger drive shaft 37, through coupling 39 and to drive shaft 37a which extends through mixing drum 31 into output section 32. The aforementioned sprockets 46 and 47 are appropriately selected to drive the drum at the required speed and in the opposite direction.

Figure 5:
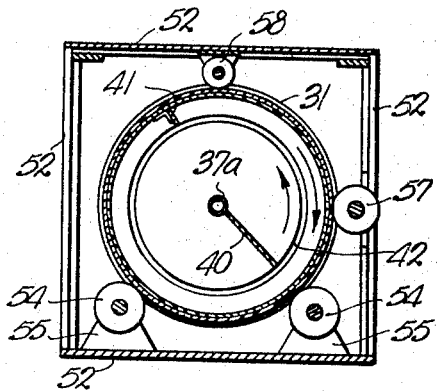
FIG. 5 is a view taken along the line 5—5 of FIG. 4 in the direction of the arrows.
Figure 6:
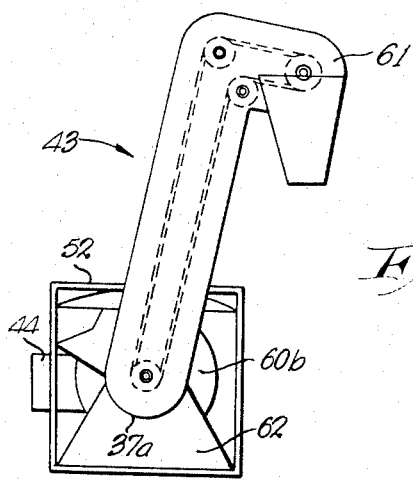
FIG. 6 is an end view of the mixing device of the subject invention taken from the right in FIG. 1.

As seen in FIGS. 2 and 5, the mixing unit is supported by a rectangular steel frame 52 and a pair of slanted support members 53 on each end thereof. The mixing drum 31 is supported approximately 4½ inches from the lower horizontal frame member 52 by a pair of rollers 54 mounted on each side thereof and supported on adjustable mounting brackets 55. These rollers play no part in supplying a driving force to mixing drum 31 and are used merely as a rotatable support while riding in the circular channel steel strips 56 welded to the exterior of drum 31. Mounted on the counterclockwise rotating mixing drum drive shaft 49 is a pair of drive rollers 57 which frictionally engage mixing drum 31 at each channel steel strip 56 thusly imparting a clockwise rotation to the drum as each drive roller moves in the same counterclockwise direction as does the first drive sprocket 44 and drive shaft 49. A pair of control wheels 58 are rigidly attached to the horizontal portion of rectangular frame 52 and engage channel steel strips 56 to facilitate the centering and stabilizing of mixing drum 31 during rotation. Suitable thrust rollers are provided to stabilize the rotation of the drum.

The sprocket 47 drives auger drive shafts 37 and 37a at the optimum r.p.m. and extends through intake end 29 and mixing drum 31 to a pair of sprockets 59 which drive bucket elevator 43.

The output section includes bucket elevator 43 which rotates with endless chain 59 carrying the buckets 43a up an inclined plane. The lower part of elevator 43 is encompassed within a boot 60, supported on legs 62, which is generally cylindrical and includes lips 60a extending interiorly of mixing drum 31. The upper lip 60a cooperates with seal 60b allowing the spiral blades 41 to run to the right-hand extremity of drum 31. When the fluent material conveyed by both the auger flighting 40 and by spiral blades 41 reach the right-hand extremity of mixing drum 31, the then mixed feed components will be delivered into the boot 60. Auger drive shaft 37a drives chain sprocket drive 59 of elevator 43 in a counterclockwise direction causing the buckets to scoop up the fluent material as they pass through the lower portion of boot 60 conveying the mixed feed up an inclined plane to a gravity discharge chute 61 positioned over the rear of feeder wagon 10. When buckets 43a reach chute 61 they rotate over in a conventional manner, depositing their contents through the chute.

It has been found that for best results a bucket-type elevator, such as elevator 43, should be used as a conveying means as most of the other types such as belt augers tend to reseparate the feed mixture by the time it could be returned to wagon 10. Furthermore, when a bucket elevator is used there is no special adjustment or refinement necessary for the feed wagon as it may be of conventional size and shape since the discharge chute may be appropriately positioned over the rear of different size wagons. By the time the feed mixture returns to wagon 10, it will fall directly upon the empty floor of the conveyor, the initial unmixed feed components having been moved to the front of the wagon leaving the rear end of same ready to receive the completely mixed feed. This further facilitates a complete "clean out" of the mixing station as the discharge section of feeder wagon 10 may be closed and the mixing station and elevator continuously run until all of the mixed feed located therein has been delivered to the wagon.

As a general rule, the load of unmixed feed components is put through 1⅓ times. This insures all ingredients running through once. It becomes necessary to recirculate the mixed load more than once if the majority of the feed components is heavy and granular such as grain. It is the option of the operator to stop the process when he observes the components to be fully mixed.

Generally speaking, a load of feed brought to the mixing device in a transporter will be run through the mixer 1⅓ times minimum or, preferably, several times, to obtain the optimum effect. A typical capacity for the device would be ¾ tons per minute of average mixture.

So long as the mixer is sufficiently full of feed that same rises above the drum flighting 40 and into the auger blades 41, the auger high speed rotation will carry same into the elevator boot over the lip extension 60a. The drum flighting 40 relatively gently tends to move the fluid, heavy stuff, feed materials, or particularly grain toward the elevator but same "waits for" the ensilage and is repeatedly picked up by the drum flighting and dropped on top of same. The speed of rotation of the drum, per se, must be sufficient to clean out essentially pure, unmixed grain or seed, which means that the grain, seed or maize will be carried up past and over the auger and not fall onto it until past top dead center, whereby it is received on the forwardly inclined parts of the auger flighting. The end blade 41 at the output boot runs to drum end wall 60b whereby to drop the last grain quantities on lip 60a.

The 2-inch clearance between blades 41 and auger 40, which is optimum, is a compromise between a shearing and moving action for the feed components. The object of the shearing and cutting interaction of the auger flighting and drum blades is to pull the rough feed apart whereby to thoroughly mix the seed and grain therewith. This clearance enables one to roll and abrade the various components of the mixture, stalks, etc. The entire process comprises feeding or passing the feed components into the mixing device from the transporter and thoroughly interpenetrating the feed components while circulating same through the mixer. The partially or wholly mixed materials are discharged out of the mixer and back into the transporter, thereafter preferably being continuously returned to the mixer. The specific feed formulation is repeatedly and continuously returned to and received from the conveyor transporter until the optimal desired mix is accomplished. Each pass through the abrading and opening mixer blade system further opens up the lighter materials and interlaces same with the heavier, granular, seeds and grain. The instant device thoroughly, quickly and optimally handles any of the forage crops or ensilages which are stored away for future mixing with grain. These include corn and sorghum ensilages, haylage (comprising ensilage from a hay crop) to which typically may be added dry chopped hay, beet pulp and cotton seed hulls, for example. A great merit and advantage of this device lies in the use of the bucket discharge which does not unmix the feed components after mixture thereof. Further, the drum blades 41 and their action always insures that the grain is fed onto the top of the roughage mixture.

Typically, the auger will have an 18-inch diameter, a 2-inch air gap between the auger flighting 40 and blades 41 and blades 41 a 4-inch depth. The blades 41 may be a continuous spiral, as illustrated, but also may optimally be interrupted after each 180° arc thereof for a 90° gap. In such case, typically, there would be four blades 41 commencing and ending 90° apart, each inclined on the wall of the drum and covering a 180° drum arc.

In operation, it is seen that only a single handling, e.g., the initial loading of the feed components to be mixed into the wagon bed, is the only human intervention required. My invention will automatically continuously convey the feed components to be mixed out of a wagon into a continuous mixing station and continuously return a completely mixed feed ration to the wagon until completely mixed, allowing the operator to disengage the wagon from the mixing unit and proceed to drive the wagon away, dispensing the properly mixed feed ration at necessary locations.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments of the invention may be made without departing from the scope thereof, it is to be understood that all matter herein set forth or shown in the accompanying drawings is to be interpreted as illustrative and not in a limiting sense.

Having thus described my invention, I claim:

1. A mixing apparatus array comprising the combination of:
   a wagon having a continuously forward moving conveyor and a cross conveyor moving transversely thereto, said cross conveyor located at the forward end of said wagon for discharging the contents thereof,
   a cylindrical rotatable mixing drum, said mixing drum receiving said contents from said cross conveyor and having a centrally mounted auger extending therethrough and further including a series of blades rigidly attached to the interior surface of said drum, and
   means operably associated with said mixing drum and said wagon for depositing the mixed contents of said drum into the end opposite the discharge end of said wagon.

2. The invention in claim 1 wherein said mixing apparatus array includes a means for rotating the drum and auger in opposite directions and at different speeds.

3. The invention of claim 2 wherein the outer periphery of said auger flighting and the inner surfaces of said drum blades are separated by a gap of approximately 2 inches.

4. The invention of claim 1 wherein the contents from said cross conveyor are received in a cylindrical boot having a centrally mounted auger therein, one end of said boot extending interiorly of said rotatable mixing drum and operable to transfer said contents therein, and
   an elevator boot affixed to the output end of said mixing drum, said elevator boot cooperating with a bucket elevator permitting the buckets of said elevator to scoop up the mixed contents and deposit same into the end opposite the discharge end of said wagon.

References Cited

UNITED STATES PATENTS

| | | | |
|---|---|---|---|
| 1,861,416 | 5/1932 | Jaeger | 259—174 XR |
| 1,997,301 | 4/1935 | Kniffen et al. | |
| 3,020,028 | 2/1962 | Bullock | 259—3 |
| 3,164,276 | 1/1965 | Bastian | 214—519 |
| 3,273,734 | 9/1966 | Schuler. | |

WALTER A. SCHEEL, *Primary Examiner.*

J. M. BELL, *Assistant Examiner.*

U.S. Cl. X.R.

214—519; 259—16, 33